Nov. 17, 1964    M. T. PHILLIPS    3,157,204
INSULATING AND PROTECTIVE COVERING DEVICES
Filed Oct. 19, 1960    2 Sheets-Sheet 1
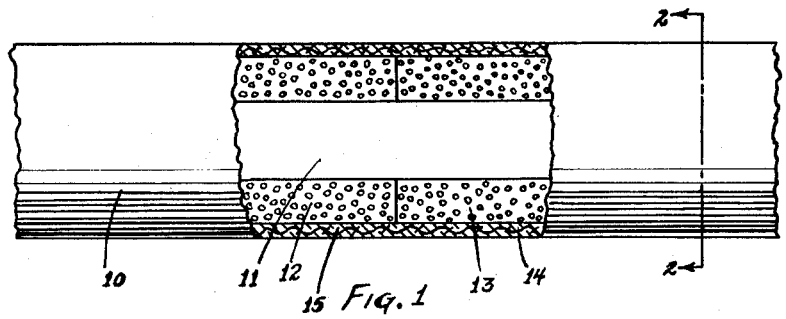
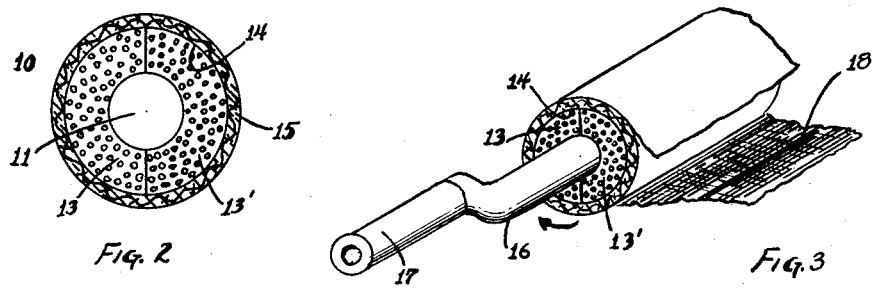
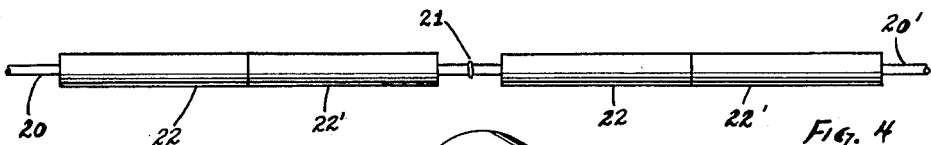
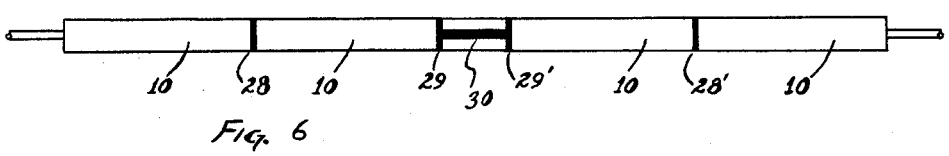
INVENTOR.
Morris T. Phillips
BY Arthur S. Collins
Agent Nov. 17, 1964    M. T. PHILLIPS    3,157,204
INSULATING AND PROTECTIVE COVERING DEVICES
Filed Oct. 19, 1960    2 Sheets-Sheet 2
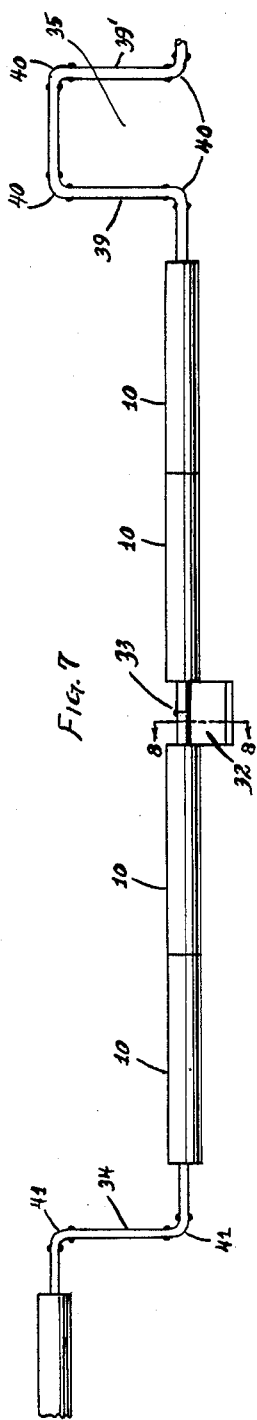
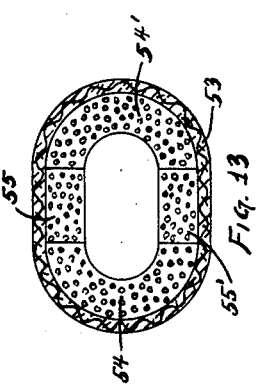
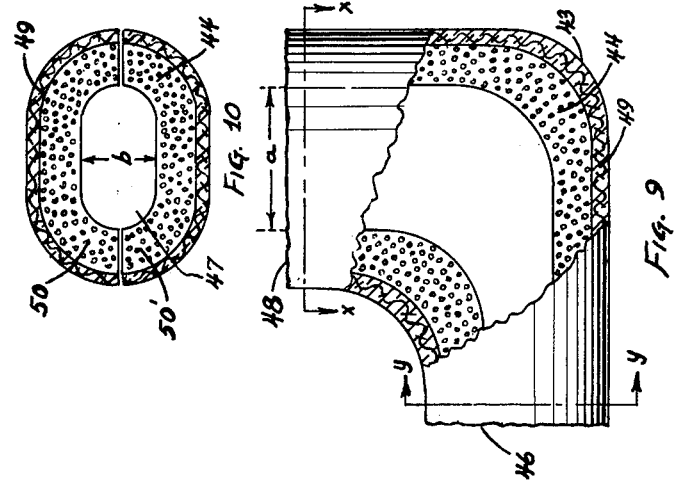
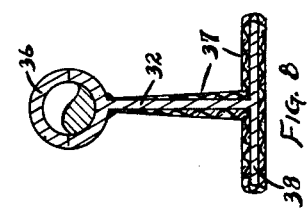
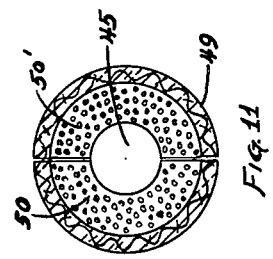
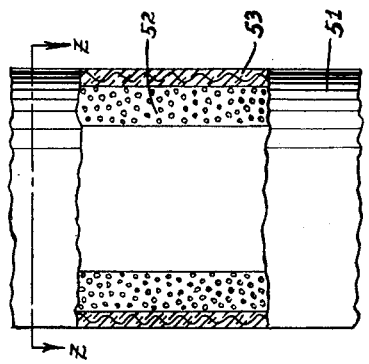
INVENTOR.
Morris T. Phillips
BY Arthur S. Collins
Agent United States Patent Office 3,157,204
Patented Nov. 17, 1964

3,157,204
INSULATING AND PROTECTIVE COVERING DEVICES
Morris T. Phillips, 10 Osage Road, Canton, Mass.
Filed Oct. 19, 1960, Ser. No. 63,619
10 Claims. (Cl. 138—137)

The present invention relates to thermally insulating and corrosion protective unitary coverings for metallic structures and parts such as piping, conduits, containers and the like. The insulating and protective coverings of this invention are particularly adapted for use on conduits which are installed in wet and/or corrosive environments such as those which are burried underground. The invention also encompasses a complete system for fabricating said coverings and for enclosing the metallic structures therein in such a way as to seal out all moisture and/or other corrosive fluids.

The problem of protecting hot or cold piping, conduits, etc. and/or the thermal insulation thereon from damage by moisture and/or other corrosive external influences (such as galvanic currents, for example) is a very old one. Although many possible solutions have been proposed over the years, including some very costly measures (such as completely enclosing a complete conduit system inside a contiguous system of outer pipes or metal casings which are finally completely welded together), none has proved to be entirely satisfactory. Evidence of this situation is readily available on all sides as will be seen from the generally acknowledged fact that the expected service life of the best underground insulated piping systems presently available averages only a very few years. At the end of this time it is necessary either to replace the protective casings, the insulation, the piping itself, or all three, or else tolerate inefficient and unsatisfactory performance from the entire system.

It is accordingly an object of my invention to provide an improved system for thermally insulating equipment used to contain and handle hot and/or cold fluids, which system not only maintains high thermal efficiency, even under adverse conditions, but actually also protects the so insulated equipment again corrosive attack by moisture and/or other external influences.

Another object of my invention is to provide a prefabricated, thermally insulating and corrosion protective covering in unitary form which is readily adapted for installation in the field on piping, conduits and other equipment in need of thermal insulation and corrosion protection. It is a further object of my invention to provide such prefabricated, unit-form, thermal insulating and corrosion protective coverings in a design that permits the preformed units to be readily and simply installed and assembled together without the necessity of threaded joints, nuts and bolts, heat welding or other costly and tedious procedures.

Still another object of my invention is to provide such prefabricated unitary coverings of a construction which is not itself subject to damage or attack by moisture, galvanic currents, or other corrosive external influences which severely degrade ferrous metals.

Another object of this invention is to provide a simple method of fabricating said unit-form coverings.

Another object of this invention is to provide field joining methods for said unit-form coverings, including the auxiliary parts needed for a complete underground conduit system. It is a further object of the invention to provide, with such field joining methods, field covering methods sufficient to eliminate the need for factory installation of the coverings on the conduit sections, fittings, or other auxiliary parts. This means that my prefabricated, unit-form, insulating and protective coverings can be separately made, sold and shipped and that the additional weight of the metal parts to be protected thereby (such as pipe, fittings, etc.), need not be included, shipped or handled with said coverings.

Other objects and advantages of the present invention will become more apparent from the detailed description and discussion of same which follows, taken in conjunction with the accompanying drawings and appended claims.

In accordance with the present invention the above objects and advantages are attained by means of a heat insulating and corrosion protective system which is based upon a composite unitary covering comprising an outer casing of tough, noncellular, thermoset resin plastic completely enclosing in compressive clinging and intimately conforming fashion an inner core of substantially rigid, foamed cellular material, said core having an opening through same of a size and shape designed to accept the article to be insulated and protected. Although the outer casing should be strong, tough and dimensionally stable, it should not be completely inflexible and brittle but, instead, should cling physically and exert stress or conform compressively onto the outside of said inner core. Said core is composed of rigid, foamed cellular material having a relatively low density and a low coefficient of thermal conductivity. The construction of this composite unitary covering and the preferred methods of manufacturing, installing and using same will be better understood by reference to the attached drawings, in which:

FIGURE 1 is a side elevation of a portion of one of the standard prefabricated unitary coverings of this invention partially broken away to reveal the structure of same along a central longitudinal section therethrough;

FIGURE 2 is a transverse section along line 2—2 of FIGURE 1;

FIGURE 3 is a fragmentary perspective view showing one end of a partly finished unit in place on a mandrel and in the process of being fabricated thereon;

FIGURE 4 is a side elevation showing two lengths of pipe in the process of being insulated by means of the unitary coverings of this invention;

FIGURE 5 is a perspective view of a modified unit-form covering designed to fill in between adjacent standard unitary coverings.

FIGURE 6 is a side elevation showing the run of piping of FIGURE 4 after a fill-in, unit-form covering of the type shown in FIGURE 5 has been installed and all the joints in and between the assembled unitary coverings have been sealed up;

FIGURE 7 represents either a side elevation or top plan view of a more complex layout of piping, showing the welded joints therein and the principal unitary covering items already in place thereon;

FIGURE 8 is a transverse section of an anchor member taken along line 8—8 of FIGURE 7 and drawn to a larger scale;

FIGURE 9 is a side elevation of a special elbow-shaped covering unit partially broken away to show a central longitudinal section thereof;

FIGURE 10 is a transverse section along line X—X of FIGURE 9;

FIGURE 11 is a transverse section along line Y—Y of FIGURE 9;

FIGURE 12 is a side elevation or plan view (broken away to show a portion of the longitudinal section) of a unit covering for use on expansion legs in a piping system; and FIGURE 13 is a transverse section along line Z—Z of FIGURE 12.

Referring now more specifically to the drawings, FIGURES 1, 2 and 3 reveal the basic construction and a method of fabrication for the standard unitary coverings of this invention. It will be seen that each unitary covering 10 consists of an inner core 12 and 13 of rigid, foamed cellular material of relatively low density and having a low coefficient of thermal conductivity, and this core is provided with an axial opening 11. Although this core could conceivably be made up of a single piece of material, more often (because of production limitations on sizes, etc.), it will be advantageous to use several segments such as lengths 12 and 13 each of which is really made up of two half sections, such as 13 and 13', as shown in FIGURE 2. The entire assembly of pieces making up the core of a standard unit is snugly encased by a complete, single, continuous casing or cladding layer 15 of tough, non-cellular, thermoset synthetic resin which conforms closely to the shape of the core and grips the outside thereof by a sort of compressive action obtained by stresses built into the casing layer during construction of the unit.

FIGURE 3 illustrates a preferred method of forming the outer casing on the core. In this figure complementary core half sections, such as 13 and 13', held together temporarily by a thin film or sheet 14 of paper, foil or cloth are mounted on a mandrel 16 having suitable bearings (not shown) for easy rotation of said mandrel by means of crank handle 17. The outer casing is then formed in situ around the outside of said sheet-wrapped core by applying a viscous (and preferably thixotropic), uncured and freshly catalyzed, synthetic resinous mixture or dope. The synthetic resinous mixture can be applied in any convenient manner, for example by brushing, troweling, spraying or by means of a doctor knife. Ideally, the resin is reinforced by means of glass fibers which may be applied loose or by winding on the core, but preferably are applied, as shown in the illustration, in the form of a mat, roving or cloth 18 impregnated with the fluid resinous mixture which is starting to react and set up. If desired, the resinous mixture can be applied warm, or heated mildly after application, in order to speed the curing and setting time thereof. However, this is not necessary since room temperature catalysts are now available for use with most resins of interest, especially the synthetic polyester resins, which are preferred in the present invention. In any case, as the resinous mixture reacts in situ, the reaction releases a certain amount of heat which tends to warm up the resinous layer somewhat, the faster the reaction the greater being the temperature rise usually noted. After the resinous layer has set up, therefore, and the curing reactions have been completed, the resultant synthetic resinous casing will gradually cool down and, as it does so, the consequent slight shrinkage of same will assure a clinging, compressive or prestressed fit around the core material. This is important since the load carrying ability of the tough, strong outer casing is thereby measurably increased due to the support given it by the rigid, foamed cellular core, and, at the same time, the rigid, foamed cellular core material is protected to the maximum degree by the uniformly cushioning and reinforcing fit of the tough resinous outer casing.

FIGURE 4 shows a run of piping in the process of being installed and insulated using the unitary coverings of this invention for insulation and protection. In this illustration two lengths of pipe 20 and 30' have been butt welded together at 21 after first having placed thereon two standard unitary coverings 22 and 22' constructed as described above. When applying these standard unitary coverings to the pipe lengths, end portions of each length adjacent the butt joint 21 are left exposed in order to enable the weld to be made and tested easily.

In order to cover this intermediate portion of exposed piping in the field, a short fill-in unitary covering 24 as illustrated in FIGURE 5 is provided. It will be seen that this fill-in unit 24 is of the same basic construction as the other unitary coverings of this invention, with a core formed of two half segments 13 and 13' of rigid, foamed cellular material and a solid outer casing 15 of glass fiber reinforced synthetic resin. However, in this fill-in unit the outer casing is split longitudinally on one side at 25 immediately adjacent one of the two longitudinal joints between core half sections 13 and 13'. At the same time, it will be seen, that, the remainder o fthe resinous casing is left intact and, being made of somewhat flexible glass fiber-reinforced resinous material, this casing serves as a hinge 26 on the opposite side of the unit adjacent to the other joint between core halves, by means of which the fill-in unit can be spread open so as to be snapped in place over the exposed intermediate portions of piping, as, e.g., at the area near the weld 21 in FIGURE 4.

FIGURE 6 depicts the same run of piping as shown in FIGURE 4 after installation of a fill-in unit like 24 over the open piping around the welded joint 21 and after sealing of all joints in and between the various assembled unitary coverings. Thus, longitudinal joint 30 in the fill-in unit has been sealed using a strip of woven glass fiber tape wide enough to overlap the open space in said joint together with brushed-on, multiple coats of the same (or a similar) viscous, fluid, synthetic resinous mix or dope as was used in fabricating the outer casing. Likewise, the transverse joints 28 and 28' between adjacent standard units as well as the tranverse joints 29 and 29' between standard units and the fill-in unit have been sealed in like manner, by wrapping strips of woven glass fiber tape impregnated with incompletely cured and still reacting, fluid, polyester resin around said joints and allowing the resin to cure or set up to a hardened state, thus chemically bonding and hermetically sealing the outer casings of the unit coverings on either side of the joint to one another.

FIGURE 7 shows a more extensive piping layout than that of FIGURES 4 and 6, and demonstrates the use of anchors and expansion loops or legs in conjunction with my technique of insulating and protecting piping systems using unitary coverings of this invention. In this illustration 32 is a pedestal shaped anchor which has been welded to the end sections of two lengths of pipe, which have been butt-welded together at 33, in order to serve as a means of immovably locating one point of the piping system. At the other ends of the two lengths of pipe are a side leg 34 and an expansion loop 35 respectively.

FIGURE 8 is a transverse section through the anchor 32 and the pipe 36 to which it is welded taken along line 8—8 of FIGURE 7 and drawn to a larger scale in order to show more details. This illustration shows how the entire surface of said anchor can be coated with a layer 37 of glass fiber reinforced synthetic polyester resin in order to protect the anchor and attached piping from corrosion particularly from the influence of galvanic ground currents. In order to complete the insulation of the section of pipe 36 to which the anchor is attached, a fill-in unit similar to that shown in FIGURE 5 can again be used. In this case a larger amount of the fill-in unit should be cut away at the split edge 25 so that cut edges will butt up evenly against the resin coated anchor when the fill-in unit is in place, the longitudinal seams on either side of the anchor are sealed as before using more resinous dope impregnated woven glass fiber tape. Likewise, the transverse joints between adjacent unitary coverings can be sealed in similar manner as before. The base 38 of the anchor is now available for fastening to an immovable object in order to fix the location of this part of the piping system.

Since metals generally have a relatively high coefficient of thermal expansion, it will be desirable in most insulated piping systems to provide room for expansion at some point inside the completely sealed system of unitary coverings so that undue stress will not be placed on the piping system when the heating fluid flows therethrough. The detailed construction of unitary coverings and parts designed for this purpose is shown in FIGURES 9, 10, 11, 12 and 13.

FIGURE 9 shows a 90° elbow-covering unit 43 designed to fit over 90° piping L's such as 40 and 41 shown in FIGURE 7. While the core 44 of the said elbow-covering unit can be formed from a rigid, foamed cellular material similar to or the same as that used in the core portions of the unitary coverings already described, it is preferred to form core 44 of a somewhat denser and physically stronger material, such as insulating cement or concrete, since such materials have both the strength to support the pipe and sufficient abrasion resistance to withstand expansion type movement of same. In any case the core 44 of these elbow-covering units is molded or otherwise formed to provide a passage therethrough which gradually expands from a round opening 45 at end 46 (corresponding in size and shape to the standard unitary covering 10) to an elongated somewhat oval opening 47 at the other end 48. This oval opening 47 has one dimension, $b$, which is substantially equal to the diameter of the circular opening 45 and another dimension, $a$, (which is substantially larger to allow room for lateral movement of the pipe leg 39 or 39' therein). In order to permit ready application of elbow-covering unit 43 to the piping, the finished unit, preferably, either before or after being encased completely in an outer layer 49 of glass fiber reinforced resin, is divided longitudinally into two symmetrical halves 50 and 50'.

In order to cover the main portions of expansion legs 39 and 39', another modified form 51 of straight unitary covering is provided as shown in FIGURES 12 and 13. Again this modified unit comprises a core layer 52 of rigid, foamed cellular material on the inside encased completely in a protective layer 53 of thermoset, glass fiber-reinforced synthetic resin. The overall cross-sectional shape of this expansion leg covering unit, as shown in FIGURE 13, matches the somewhat oval cross-sectional shape of end 48 of the elbow covering unit as shown in FIGURE 10 so that a smooth, butt joint can be provided between these units on the side legs 39 and 39' of an expansion loop 35.

FIGURE 13, which is a transverse cross-section along line Z—Z of FIGURE 12, shows how the core layer of this oval-shaped unitary covering 51 can be made up conveniently of four longitudinal segments, two of which 54 and 54' are roughly semi-cylindrical while the other two 55 and 55' are merely flat strips.

Such an oval or approximately elliptical shaped unitary covering 51 can also be used, if desired, on either side legs, such 34 in FIGURE 7, in order to permit lateral movement thereof. In this case pipe elbows 41 should, of course, also be covered by 90° elbow coverings of the type 43 shown in FIGURES 9, 10 and 11.

It will, thus, be seen from the above complete description and illustration of the standard unitary covering of this invention and associated parts and auxiliary items that a complete system is provided by means of which even extended metal structures, such as underground piping layouts, etc., can be completely enclosed and sealed against moisture penetration, galvanic currents, and other corrosive influences, and by means of which loss of heat from said pipe, or penetration of heat thereinto, can be simultaneously minimized. Moreover, the superiority of performance over an increased period of use as well as the economic advantages of the completely non-metallic unitary coverings of my invention will be obvious when contrasted to the prior use of units having outer supporting and protective casings which, if not metallic (e.g. cast iron or steel) were usually formed of brittle ceramic or cementitious material (e.g. tile or structural concrete), on which serious losses are often sustained due to breakage either before, during or after installation. Moreover, said metal encased systems necessitate factory installation thereof around the metal object (e.g. pipe) to be protected.

Although the basic design and novel general construction of the unitary coverings of this invention have already been described, a still better understanding of the present invention will be had from the following description of specific preferred embodiments thereof. It should be understood, however, that these specific embodiments are described merely for purposes of illustation and that the scope of the invention claimed is limited only by the numbeeed claims appended hereto.

*Example*

In one particular case, a foamed cellular vitreous, glassy material of the type described in Ford Patents U.S. 2,485,724, U.S. 2,514,324 and U.S. 2,544,954 was used as the insulating core material. Such products are commercially available from the Pittsburgh Corning Corporation under the tradename, Foamglas, having a density of about 9 lbs./cu. ft., a coefficient of thermal conductivity of about 0.55 B.t.u./hr./sq. ft./° F./in. at about 300° F. and a compressive strength of about 100 lbs./sq.in. This material is acid resistant, capable of use at temperatures as high as 800° F. and, owing to its closed or sealed cellular structure, it is impermeable to moisture, liquid or fluid penetration.

Several paired lengths of complementary semicylindrical sections of said Foamglas having an inside diameter of about 4 inches and an outside diameter of about 8.6 inches, each set of paired sections being held together by means of a sheet of foil coated paper, were mounted on a mandrel in end to end relationship to give a total length of 8 feet. The entire outer surface of these thus assembled cores was coated with a thin layer of a styrene modified, unsaturated polyester of propylene glycol with maleic anhydride. This resinous polyester had a viscosity of about 1000 centipoises at room temperature and had been freshly catalyzed by means of a small amount of methyl ethyl ketone peroxide catalyst and cobalt naphthenate activator. The assembly was then wrapped with glass cloth, impregnated with more of the same resin and a final coat of the resin applied on top of that. Then the entire assembly was allowed to stand until the glass fiber reinforced resinous outer casing had set up and hardened.

On testing and examination of the finished article the outer casing was found to be tough, hard but somewhat resilient, and completely unaffected by water and ordinary liquids and dilute aqueous solutions such as normal ground waters. Furthermore, it was found that the glass fiber reinforced resinous outer casing had tightly adhered itself all around the core layer by a sort of shrinking action which had compressively forced the intervening sheet of foil coated paper to become embedded in the surface irregularities of the cells on the outer surface of the cellular Foamglas core material.

In the above example, an equally serviceable product can be made for most purposes by using as the core material similar or related foamed, cellular, vitreous or cementitious materials, including those having an open or communicating cellular structure. Some of these materials are more refractory than the Foamglas, such as highly siliceous vitreous compositions, and can accordingly withstand even higher temperatures should the intended application require same.

Also, should greater structural strength be needed (for pipe load bearing and support, for example), then higher density forms of the same general type of cellular core materials can be used, or concrete type materials rendered more insulating by the inclusion of asbestos, vermiculite and similar materials can be used. Still another possibility would be the use of a composite core in which relatively thin or small spacer elements or rings of noncellular and non-metallic but exceptionally strong material are placed or embedded in the foamed, cellular core at intervals throughout the length thereof. Said spacer elements or rings are either constructed with an outer diameter equal to that of the foamed cellular material or with radial portions the outer edges of which coincide with the outer surface of said core.

Moreover, if the metal object to be covered and protected is not to be operated at temperatures above 400–

500° F., organic materials can be considered for use in constructing the foamed, cellular insulating core. In fact, certain of these materials such as polyurethane foams are available with even lower densities and lower coefficients of thermal conductivity than the vitreous foams described above and are, therefore, even more effective at a given thickness as thermal insulators. However, these materials generally have somewhat lower structural strength than the vitreous, inorganic, cellular core materials, and the use of embedded spacers or pipe support rings constructed of stronger material is, therefore, likely to be even more advantageous in these foamed organic core materials. In any case the foamed plastics which are most suitable are the rigid types of material, preferably those characterized by a closed cellular structure, of which some of the rigid polyurethane foams are good examples. Some of these are available with a thermal conductivity of about 0.15 B.t.u./hr./sq. ft./° F./in.

In place of the above-mentioned specific polyester resin, many other similar fluid, unsaturated polyesters resins of suitable viscosity and setting rate can also be used including those based on other polyfunctional acids such as adipic, fumaric, phthallic, etc., in combination with propylene glycol, glycerol or other polyfunctional glycols, and whether mixed with styrene or other monomer modifiers, such as diallyl phthallate or triallyl cyanurate, and whether containing stabilizers or inhibitors, such as hydroquinone or other polyhydric phenols. A wide variety of proprietary products of these types are, of course, available, e.g. under the Laminac trade name, under the trade name of Pleogen, under the Vibrin trade name, under the Selectron trade name, or under the trade name of Plaskon.

Although other thermosetting resinous materials, such as the phenolics or melamine resins, could be used, with or without glass fibers or other reinforcing materials embedded therein, the unsaturated polyesters, as well as the somewhat similar epoxy resins, are particularly desirable because cure can be effected in either of these types in an entirely satisfactory manner without the application of heat from an external source. This behavior is especially advantageous for effecting the final sealing in the field of the joints in a finished integral covering system made up of a series of the unitary coverings of this invention. The epoxy resins are essentially linear polymers, formed e.g. by the reaction of epichlorhydrin with bis-phenol A. The resulting viscous liquid resinous fluids can be cured by reaction with amine type reagents to give equally hard, and impervious casings.

The polyester resins are, of course, usually cured or hardened by the action of an organic peroxide on the monomer-solvent+resin mixture. For best results at room temperature the ketone type peroxides are preferred, and setting time can be reduced by using added activators such as cobalt naphthenate, mercaptans or amines.

Although an attempt has been made to discuss several of the more important variations and modifications which can be made in my basic design of a protective unitary covering and to mention some of the alternative materials of construction which can be employed therein, it will be realized that still other modifications and variations thereof are possible, many of which will be obvious to those skilled in the art. For example, a plurality of metal objects can be enclosed in parallel (such as two pipes or conduits in side by side relationship) within a single length of unitary covering as, for this purpose, it will only be necessary to provide suitable multiple openings through the core of said covering. Furthermore, whether single or multiple objects are to be enclosed within the same unitary covering, it may sometimes be desirable in order to achieve the best balance of structural strength and thermal insulation efficiency to use cores which are composed of different materials at various points within the unit. For example, one can insert relatively narrow rings of denser, stronger material between every few feet of the rigid foamed cellular material in order to serve as supports for the pipe or other metal objects to be enclosed and, thus, protect the weaker but more insulating cellular material from abrasion or other damage.

Having described my invention together with preferred embodiments thereof, what I claim and desire to secure by U.S. Letters Patent is:

1. A preformed, unitary, elongated, insulating and protective covering member preshaped to the dimensions of final used and closed laterally so that an elongated article to be protected can only be introduced to said covering member longitudinally, said member comprising:
   (1) a core of substantially rigid, cellular material of relatively uniform cross-sectional shape having at least one opening extending therethrough longitudinally of a size suitable for accepting said elongated article to be protected; and
   (2) completely surrounding said core laterally, a continuous cladding layer of tough, non-cellular, internally reinforced, thermoset, synthetic resinous material, said cladding layer being thinner than said core but having by itself substantial load carrying strength and being compressively fitted around the outside of said core, thereby insuring uniform physical support between said core and said cladding layer and maximizing the load carrying strength and physical integrity of the complete unitary covering member.

2. The preformed, unitary, insulating and protective covering member of claim 1, in which the cellular material composing said inner core is a foamed vitreous material characterized by a cell structure predominantly of the closed cell type.

3. The unitary, composite covering member of claim 1 in which the said inner core is a foamed, high temperature, thermoset plastic composed predominantly of organic matter.

4. The unitary, composite covering member of claim 3 in which the said foamed thermoset plastic comprises a polyurethane resin.

5. The unitary, composite covering member of claim 1 in which the continuous cladding layer of thermoset resinous material is internally reinforced with glass fibers.

6. The unitary, composite covering member of claim 1 in which the said cladding layer is internally reinforced by a continuous winding of glass fibers and also encompasses a barrier film of vapor impervious material.

7. A method of fabricating a unitary, insulating and protective covering designed to fit over and enclose articles to be covered and protected thereby comprising the steps of assembling a series of rigid core elements of thermally insulating character so as to form a unitary core of relatively uniform cross-sectional shape having suitable openings extending completely therethrough longitudinally for receiving the articles to be covered and protected, completely covering the outwardly exposed lateral surface of said unitary core uniformly with a viscous dope containing an actively reacting synthetic resin composition chosen from the group consisting of polyester resins and epoxy resins, then applying a layer of woven glass fibers impregnated with additional amounts of the same viscous dope over the entire dope-coated unitary core, applying a finish coat of the same viscous dope over the entire glass fiber layer and causing said viscous dope to react in place and set up to form an integral outer layer of tough, non-cellular, hard but somewhat resilient, thoroughly cured and dimensionally stable, moisture impermeable, glass fiber reinforced resin.

8. The method as described in claim 7 in which heat is applied from an external source to the said coated assembly in order to accelerate the reaction and setting up of the viscous dope to form said integral outer layer.

9. A method of completely enclosing an entire fluid conduit system within a continuous, hermetically sealed, insulating and protective covering comprising: the steps of applying over major portions of said conduit system a series of separate major unitary covering members as defined in claim 1; enclosing the exposed portions of said conduit system left between said thus applied major unitary covering members by means of shorter fill-in covering units of a construction and a cross-sectional shape and size matching the adjoining major unitary covering members, said fill-in units being provided with longitudinal joints permitting them to be spread open and fitted laterally around said exposed portions of conduit intermediate the previously applied major unitary covering members; and then sealing all open joints in and between said fill-in units and said major unitary covering members by means of strips of woven glass fiber tape impregnated with a viscous, resinous dope containing an actively reacting mixture of resinous ingredients capable of setting up rapidly to a hardened, rigid but somewhat resilient state.

10. The unitary covering member of claim 1 in which the internally reinforced, thermoset, synthetic resinous material of said cladding layer comprises a polyester resin.

References Cited in the file of this patent

UNITED STATES PATENTS

| | | |
|---|---|---|
| 2,532,587 | Williamson | Dec. 5, 1950 |
| 2,728,702 | Simon et al. | Dec. 27, 1955 |
| 2,776,231 | Brown | Jan. 1, 1957 |
| 2,784,129 | Stephens | Mar. 5, 1957 |
| 2,797,731 | Carlson | July 2, 1957 |
| 2,892,972 | Ross | June 30, 1959 |
| 2,906,317 | Keyes | Sept. 29, 1959 |
| 2,936,792 | MacCracken et al. | May 17, 1960 |
| 2,937,665 | Kennedy | May 24, 1960 |
| 2,956,310 | Roop et al. | Oct. 18, 1960 |
| 2,960,425 | Sherman | Nov. 15, 1960 |
| 2,962,402 | Sweeney | Nov. 29, 1960 |

OTHER REFERENCES

Gustin-Bacon Mfg. Co. Bulletin "G-B Ultrafine Pipe Insulation," published by Gustin-Bacon Mfg. Co., of Kansas City, Mo.